US011250508B2

(12) United States Patent
Lutnick et al.

(10) Patent No.: US 11,250,508 B2
(45) Date of Patent: Feb. 15, 2022

(54) INTERPROGRAM COMMUNICATION USING MESSAGES RELATED TO EVENTS AND ACTIONS ON AN EXCHANGE

(71) Applicant: BGC PARTNERS, INC., New York, NY (US)

(72) Inventors: Howard W. Lutnick, New York, NY (US); Bijoy Paul, New York, NY (US); Michael Sweeting, Surrey (GB)

(73) Assignee: BGC PARTNERS, INC., New York, NY (US)

( * ) Notice: Subject to any disclaimer, the term of this patent is extended or adjusted under 35 U.S.C. 154(b) by 289 days.

(21) Appl. No.: 16/658,779

(22) Filed: Oct. 21, 2019

(65) Prior Publication Data

US 2020/0051170 A1 Feb. 13, 2020

Related U.S. Application Data

(63) Continuation of application No. 12/406,260, filed on Mar. 18, 2009, now Pat. No. 10,452,130.

(51) Int. Cl.
*G06Q 40/04* (2012.01)

(52) U.S. Cl.
CPC .................................. *G06Q 40/04* (2013.01)

(58) Field of Classification Search
CPC .................................................... G06Q 40/04
See application file for complete search history.

(56) References Cited

U.S. PATENT DOCUMENTS

| 6,498,234 | B1 | 12/2002 | Wallis |
| 7,870,541 | B1 | 1/2011 | Deshpande |
| 2002/0023037 | A1 | 2/2002 | White, Jr. |
| 2003/0093362 | A1 | 5/2003 | Tupper et al. |
| 2003/0130926 | A1 | 7/2003 | Moore et al. |
| 2003/0192035 | A1* | 10/2003 | Duesterwald ald ........... G06F 9/30134 717/138 |
| 2003/0225663 | A1 | 12/2003 | Horan et al. |
| 2003/0225672 | A1 | 12/2003 | Hughes et al. |
| 2003/0229568 | A1 | 12/2003 | Richmann et al. |
| 2006/0089899 | A1* | 4/2006 | Durkin ................... G06Q 40/04 705/37 |
| 2006/0218071 | A1* | 9/2006 | Sweeting ............... G06Q 30/08 705/37 |
| 2007/0067231 | A1* | 3/2007 | Marks de Chabris . G06Q 40/06 705/36 R |
| 2007/0233594 | A1* | 10/2007 | Nafeh ..................... G06Q 40/00 705/37 |
| 2007/0265954 | A1 | 11/2007 | Mather et al. |

(Continued)

FOREIGN PATENT DOCUMENTS

| JP | 2001-155086 | 6/2001 |
| JP | 2007-241771 | 9/2007 |

(Continued)

OTHER PUBLICATIONS

Ming Fan, J. Stallaert and A. B. Whinston, "A Web-based financial trading system," in Computer, vol. 32, No. 4, pp. 64-70, Apr. 1999, doi: 10.1109/2.755007. (Year: 1999).*

(Continued)

*Primary Examiner* — Bennett M Sigmond
*Assistant Examiner* — Bolko M Hamerski

(57) ABSTRACT

Various embodiments of exchanges are described. Methods and other embodiments are also described.

19 Claims, 11 Drawing Sheets

(56) References Cited

U.S. PATENT DOCUMENTS

| | | | |
|---|---|---|---|
| 2007/0277021 A1 | 11/2007 | O'Connor et al. | |
| 2008/0086401 A1 | 4/2008 | Mather | |
| 2008/0097893 A1* | 4/2008 | Walsky | G06Q 30/0601 705/37 |
| 2010/0198749 A1* | 8/2010 | O'Connor | G06Q 40/00 705/36 R |
| 2010/0241550 A1 | 9/2010 | Lutnick et al. | |
| 2010/0293353 A1 | 11/2010 | Sonnier | |
| 2012/0089497 A1* | 4/2012 | Taylor | G06Q 40/04 705/35 |
| 2012/0089504 A1* | 4/2012 | Loveless | G06Q 40/06 705/37 |
| 2014/0180894 A1* | 6/2014 | Mintz | G06Q 40/00 705/37 |
| 2015/0019397 A1* | 1/2015 | Buck | G06Q 40/04 705/37 |
| 2019/0318429 A1 | 10/2019 | Lutnick et al. | |

FOREIGN PATENT DOCUMENTS

| | | |
|---|---|---|
| JP | 2008-541310 | 11/2008 |
| JP | 2009-509219 | 3/2009 |
| WO | WO 2010/101703 | 9/2010 |

OTHER PUBLICATIONS

U.S. Appl. No. 12/399,570, dated Mar. 2009, Lutnick et al.
U.S. Appl. No. 12/406,260, dated Mar. 2009, Lutnick et al.
U.S. Appl. No. 10/380,689, dated Aug. 13, 2019, Lutnick et al.
U.S. Appl. No. 10/453,130, dated Oct. 22, 2019, Lutnick et al.
Notification of Transmittal or Search Report and Written Opinion of the ISA, or the Declaration, for International Application No. PCT/US10/23914, dated Apr. 9, 2010 (8 pages).
Definition of "Data Bus" from Microsoft® Computer Dictionary, By: Microsoft Press: Publisher: Microsoft Press, Pub. Date: Mar. 15, 2002 and In Dictionary of Engineering Terms, Butterworth-Heinemann. Retrieved from http://www.credoreferemce.com/entry/bhidet/bus.
Philip Koopman, Stack computers: the new wave, 1989, Chapters: Multiple-stack, 0-operand Machines, "3.2 A generic stack machine.
Office Action for Japanese Application No. 09-2307WOJP-1; dated Aug. 12, 2016 (31 pages w/English Translations).
CA Examiners Report for Application for 2754817; dated Apr. 12, 2017; 6 pages.
JP Notice of Allowance for Application for 2015-116229; dated Apr. 18, 2017; 4 pages.
AU Notice of Acceptance for Application for 2016203888; dated Jun. 7, 2017; 3 pages.
CA Examiners Report for Application for 2754817; dated Mar. 14, 2018; 5 pages.
JP Office Action for Application for 2017-094533; dated Sep. 4, 2018; 12 pages (w/English Translations).
AU First Examiners Report for Application for 2017216503; dated Nov. 19, 2018; 2 pages.
JP Office Action for Application for 2017-094533; dated Feb. 12, 2019; 4 pages (w/English Translations).

* cited by examiner

INTERPROGRAM COMMUNICATION USING MESSAGES RELATED TO EVENTS AND ACTIONS ON AN EXCHANGE

CROSS-REFERENCE TO RELATED APPLICATIONS

This patent application is a continuation application of U.S. patent application Ser. No. 12/406,260, filed Mar. 18, 2009, the disclosure of which is hereby incorporated by reference herein in its entity.

DETAILED DESCRIPTION

Figure 1:
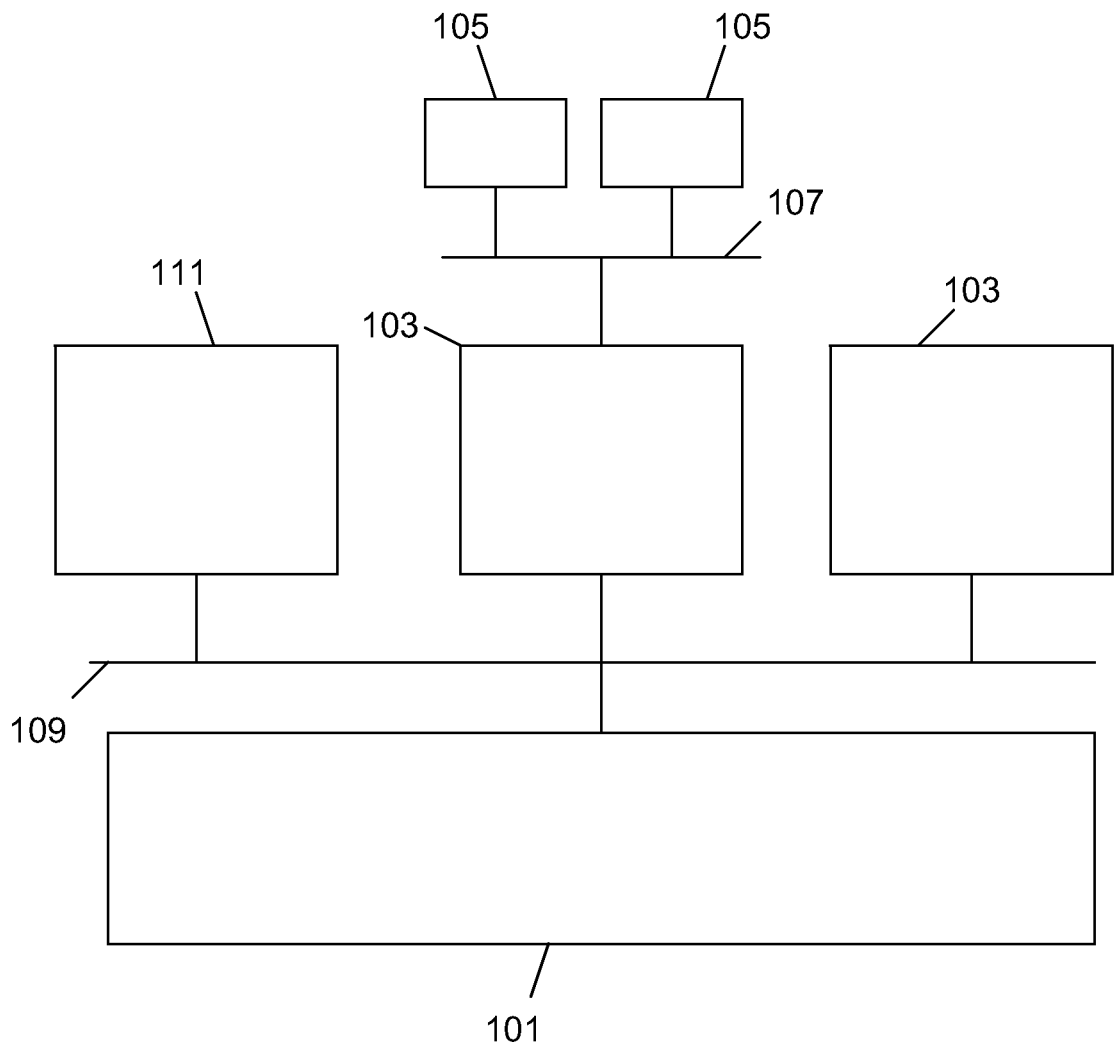
FIG. 1 illustrates an example set of entities that may be involved in trading in some embodiments.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Example Embodiments

FIG. 1 illustrates a configuration of an example exchange 101 coupled to participants 103 of the exchange. The exchange 101 may include one or more computer systems and/or computer components configured to provide trading services to the participants 103. The exchange 103 may accept information regarding trading intentions of the participants 103. The exchange 101 may determine when the trading intentions of a pair of participants match. The exchange 101 may execute a trade that satisfies the matching trading intentions.

An exchange may include one or more computer system and/or computer components configured to match orders for financial instruments and facilitate execution of trades that fulfill the matching orders. An exchange may include an alternative trading system such as LiquidNet alternative trading system or Aqua Equities alternative trading system. One example of an alternative trading system is described in U.S. patent application Ser. No. 12/257,499 filed Oct. 24, 2008, which is hereby incorporated herein by reference. An exchange may include a primary exchange through which initial offerings and/or secondary trading may occur, such as the New York Stock Exchange, and the Chicago Mercantile Exchange.

A financial instrument should be understood to include an instrument that evinces ownership of dept or equity, and/or any derivative thereof, including equities, stocks, fixed income instruments, bonds, debentures, certificates of interest or deposit, warrants, options, futures, forwards, swaps, or generally any security.

Participants 103 may include any entity that participates in trading activity through the exchange 101. For example, a participant may include an algorithmic trading system. Such an algorithmic trading system may monitor information and request that various trades be executed by the exchange 101 based on changes to the information. A participant may include a proprietary trader. Such a proprietary trader may request that trades be executed by the exchange 101 for the participant's own accounts. An example of such a trader may include a hedge fund. Yet another example of a participant may include a broker. A broker may request that trades be executed by the exchange 101 on behalf of clients 105 of the broker. In some implementations, a client 105 may communicate with a broker through a communication network 107. Such a communication network, may include, for example a telephone network for traditional brokerage services, a computer network for electronic brokerage services, and/or any other communication network (e.g., the Internet, a private network, etc.).

It should be recognized that participants may include any combination of computer(s) and human(s). For example, internet brokers such as Etrade may act as a participant directed by a human investor, traditional brokers may interface with direct connections to an exchange, algorithmic traders may involve a computer performing an algorithm based on data and producing orders based on the output of the algorithm with little or no input from humans, investment banks may include highly skilled investment professionals that analyze companies and produce orders based on that information (e.g., through an intermediary or directly to an exchange, and so on.

In some embodiments, participants 103 may communicate with the exchange 101 through a communication network 109. Communication network 109 may include, for example, the Internet, a data bus, a dedicated wired or wireless communication link, and/or any other communication network. Communication network 109 may allow one or two way communication. Communication network 109 may enable communication using, for example TCP/IP. Information may be passed though communication networks in any form, including for example as multiple data packets.

In some embodiments, one or more participants may communicate information relating to trading intentions to the exchange. For example, an order may be transmitted in the form of an electronic message from the participant through communication network 109 to the exchange. The order may define a side of a trade for a financial instrument.

One example set of communications that involving the linking of multiple orders for execution through an exchange is described U.S. patent application Ser. No. 09/627,705 filed on Jul. 28, 2000, which is hereby incorporated herein by reference.

In some embodiments, an exchange may communicate that a matching order is found to a participant. For example, the exchange may transmit an electronic message identifying that a match to an order has been located. In some implementations, if a match is found, the order may be executed and such an indication may be transmitted. In some implementations, if a match is found, a participant may be asked to confirm an order before a trade is executed, and indications may be translated to facilitate such an exchange.

In some embodiments, a participant may communicate information relating to one or more events on which an order may be conditioned. For example, in some implementations, an electronic message may indicate that an order should be placed if an event occurs. An event may include an event related to a financial instrument for which the order is placed, an event related to a different financial instrument, an event not related to a financial instrument, and/or any other event. An event may include an existence of a condition (e.g., it is between 7 AM and 9 PM), a change in a value of a second financial instrument, a change in a trading volume of a second financial instrument, a release of earnings by a company, a change to regulations that regulate an industry, a change in credit rating of a company, and/or any other occurrence, happening, and so on. In some implementations, an event may relate to an occurrence that may or may not happen.

In some embodiments, a participant may communicate information relating to one or more events that may cause an adjustment to an order. For example, in some implementations, an electronic message may indicate that an order should be removed from an order queue if an event occurs, an electronic message may indicate that a quantity of an order should be changed if an event occurs, an electronic message may indicate that a passive order should be changed to an aggressive order if an event occurs, an electronic message may indicate that a price of an order should change if an event occurs, an electronic message may indicate that an order should be returned to a queue if an event occurs, and/or an indication may indicate that any other adjustment to an order should occur after an event occurs.

In some embodiments, an exchange may communicate information related to events to a participant. For example, in some implementations, an exchange may transmit electronic messages that indicate that events have occurred and/or have not occurred.

In some embodiments, communicating through communication network 109 may include a delay. The delay may include the time it takes for information to travel from a source of the information to a destination of the information. For example, a delay may include time for routing of information through a network, time for information to travel through wires, time for information to be processed by intermediate systems and so on. Delay may result in suboptimal trading results in some circumstances, such as when a multiple participants enter into a race to trade after an event happens.

Information source 111 may include one or more providers of information that may be relevant to decisions regarding trading. Information source 111 may part of exchange 101 and/or may be a separate entity. Information may include, for example, information about trades that have occurred, information about orders that are pending (e.g., in an order queue), information about a trading volume, information about a price change, information about a financial instrument, information about an index, information about a type of financial instrument, information about an industry, information about a political event, information about a regulatory change, and/or information about any other event. Such information may be useful, for example for algorithmic trading systems that make decisions about orders based on such information as well as for human investors that make decisions about trading based on a variety of information. In some implementations, information that relates to events on the exchange (e.g., a trading stack, trade executions, etc.) may be reported by an exchange with smaller delays than from an intermediary that processes such information because of fewer communication delays, though may still be delayed based on communication delay through the communication network, for example.

Figure 2A:
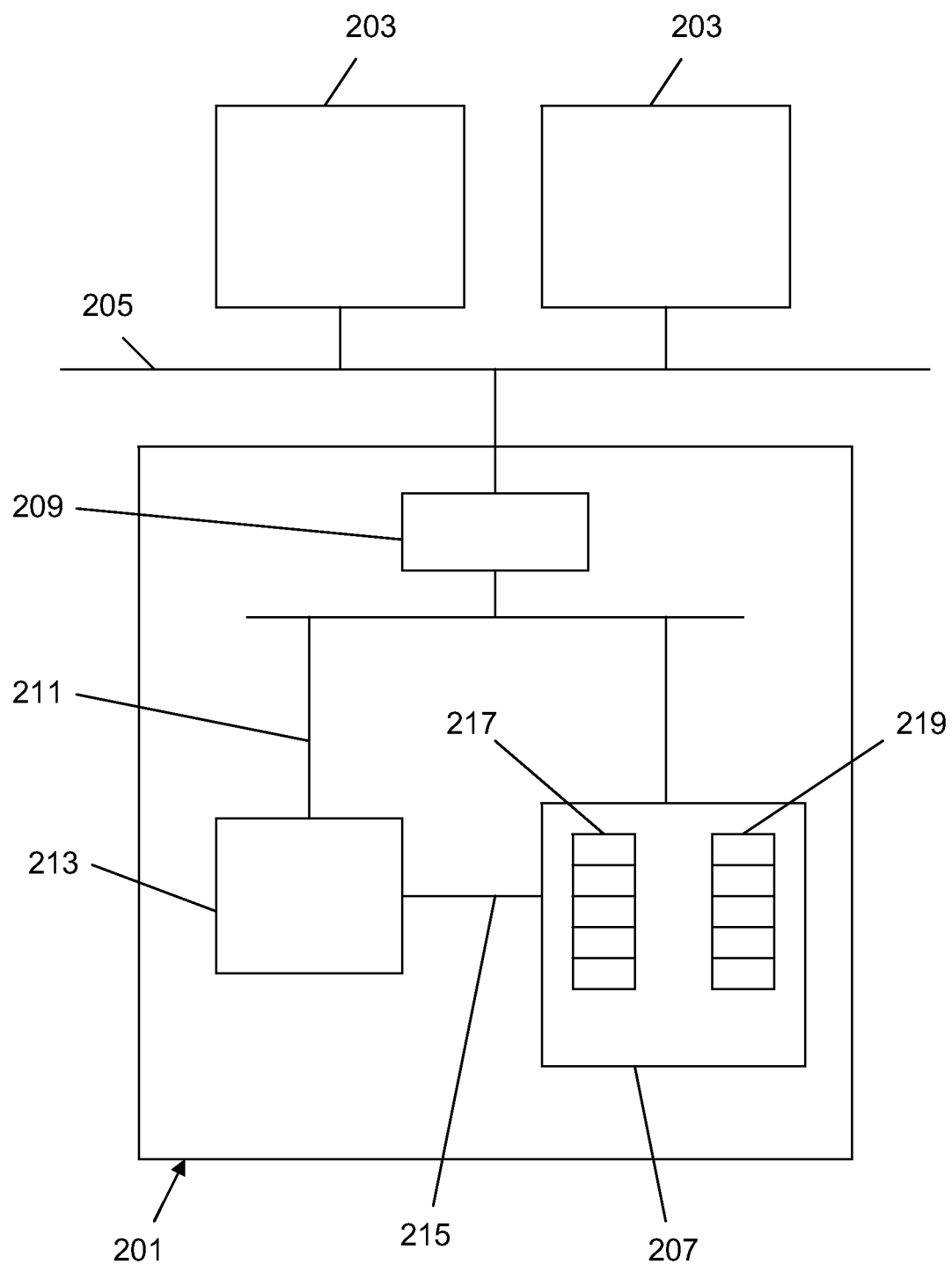
FIGS. 2A, 2B, and 2C illustrate example exchanges that may be used in some embodiments.

FIG. 2A illustrates an example exchange 201 according to some embodiments. As illustrated, exchange 201 may be coupled to participants 203 through communication network 205. Some example participants and communication networks are described above with respect to FIG. 1. As illustrated in FIG. 2A, exchange 201 may include a matching engine 207, an interface 209, a first communication network 211, an event engine 213, and a second communication network 215. It should be recognized that these components are given as examples only and that various embodiments may include any number of additional and/or alternative components. For example, in some implementations, a single bus may be used, an interface may be a separate machine, a separate rule processing engine may be used, an event engine and matching engine may be combined, any other components that provide additional desired functionality may be included, and so on.

Matching engine 207 may include one or more machine components. In some implementations, a matching engine may include one or more processors. Such processors may include general purpose processors configured to matching orders. Such configuration may be made via hardware and/or software (e.g., programming and/or wiring). A matching engine may be dedicated to a particular financial instrument, a particular event, a particular order type, a particular financial instrument type, a particular event type, a particular type of adjustment to an order, and so on as desired. In some implementations, a matching engine may include a machine component (e.g., a processor) that determines matches among orders for a financial instrument and executes trades that fulfill matching orders. In some implementations, a matching engine may maintain a queue of buy orders and a queue of sell orders that maintain a priority order for matching so that if multiple buy orders match a single sell order, the buy order with the highest priority in the queue is chosen as the matching buy order.

Matching engine 207 may include a queue of buy orders 217 for a financial instrument. The queue of buy orders may include a prioritized collection of orders to buy a financial instrument. Orders may be prioritized in any desired method. For example, orders may be prioritized based on a time in which they are placed in the queue, a time at which they are received by an exchange, a time in which they are created, a time in which they are received by the matching engine, a time associated with an event that triggered the creation of the order, a size of an order, a price of an order, and so on. In one implementation, for example, a queue may be primarily prioritized so that buy orders for the highest price per financial instrument are put at highest priority. In some implementations, the queue may be secondly prioritized so that buy orders for the same price are prioritized based on when the order is placed in the queue. It should be recognized that any prioritizing may be used in various embodiments. It should be recognized that a queue may include any collection that is prioritized in any way and that the word queue should not be read to need any additional properties than described herein nor to necessarily be exclusive of such properties.

Matching engine 207 may include a queue of sell orders 219 for the financial instrument. The queue of sell orders may include a prioritized collection of orders to sell a financial instrument. Orders may be prioritized in any desired method. For example, orders may be prioritized based on a time in which they are placed in the queue, a time at which they are received by an exchange, a time in which they are created, a time in which they are received by the matching engine, a time associated with an event that triggered the creation of the order, a size of an order, a price of an order, and so on. In one implementation, for example, a queue may be primarily prioritized so that sell orders for the lowest price per financial instrument are put at highest priority. In some implementations, the queue may be secondly prioritized so that sell orders for the same price are prioritized based on when the order is placed in the queue. It should be recognized that any prioritizing may be used in various embodiments.

In some implementations, a queue may include memory (e.g., RAM, registers, solid state memory, hard disk drives, etc.). In some implementations, an ordering of elements in the memory may correspond to an ordering of priority in the queue. In some implementations, for example, a set of memory locations that include orders may be prioritized by a linked list by linking from a first prioritized memory location to a next memory location, and so on. In other implementations, physical memory locations may have static priority. In other implementations, any other method of ordering memory and/or storing and/or prioritizing orders may be used.

In some implementations, a placeholder order may be placed in a queue. For example, such an order may be used to maintain a time-based priority of an order that is removed from a queue (e.g., temporarily). Such a placeholder order may be placed in a queue, for example, by adding a node to a list that indicates where the order would be but that indicates to the matching engine that it should not be used to actually match an order. In other implementations, a prior order pay be flagged as inactive so that it is not matched against and such a flag may be changed later to reinstate an order.

In some implementations, multiple queues of buy orders and/or multiple queues of sell orders may be used. For example, in some implementations, a separate queue may be used for very large orders than for other orders, a separate queue may be used for limit orders than for market orders, multiple queues may be used to balance a load of orders, and so on.

In some embodiments, a matching engine may receive an indication of an order. Such an indication may be received through a bus, through another communication network, from a remote system, from an event engine, and so on. The matching engine (e.g., in response to receiving the indication of the order) may add the order to an appropriate queue at an appropriate priority level. For example, if the order is a buy order, the order may be added to the queue of buy orders at a priority level according to the priority procedures of the matching engine. In some implementations, an instruction to add the order to the queue may be added to an instruction stack. An instruction stack may include a collection of instructions that the matching engine has been asked to process in some priority order (e.g., FIFO). When the matching engine finishes processing other instructions that have a higher priority in the instruction stack, the matching engine may process the instruction to add the order to the queue, which may cause the matching engine to add the order to the queue.

In some embodiments, the matching engine may include an arithmetic logic unit and/or other processing element that performs processing for the matching engine. For example such a processing unit may execute instructions from the instruction stack. Such a processing element may make a determination regarding whether two orders are matching. Such a processing element may take actions if two orders are matching. A matching engine may have any number of such processing elements that may be generalized and/or specialized for desired purposes. For example, in some implementations, a matching engine may include a processing element that adds orders to the queues and a processing element that determines if matches exist in the queues and takes actions accordingly.

In some embodiments, the matching engine may determine whether orders in buy order queue and orders in the sell order queue match. For example, a processing element may determine if a highest priority buy order matches a highest priority sell order. In some implementations, multiple orders may match a single order. In some implementations, multiple orders may match multiple orders. An order may match another order, for example, if the orders are for opposite sides of a trade for the same financial instrument and are for a same price and/or overlapping price range. In some implementations, orders may match if they are for a similar quantity (e.g., an order may match only orders that are for at least 10% of the quantity of the order). In some implementations, multiple smaller orders may match a single larger order. In some implementations, orders may be partially matched. A partially matched order may be removed from the queue, left in the queue with the unmatched portion, and so on.

In some embodiments, in response to determining that a first and second order match, the matching engine may execute a trade that fulfills at least a portion of each of the two orders. Execution may include, for example, transmitting an indication that the execution should be performed. In some implementations, execution may include altering information about the orders stored, for example on a database, to indicate that the orders are executed against one another. In some implementations, execution may include clearing, transferring money, transferring ownership, back-end processing, and so on. In some implementations, some or all of the action involved in execution may be performed by a remote system, the exchange, the matching engine, people, and so on. It should be recognized that any actions that cause a transfer of ownership of a financial instrument may be used in various embodiments as an execution.

As mentioned above, exchange 201 may include an interface 209. Interface 209 may facilitate communication of information between the exchange and outside the exchange (e.g., to and from communication network 205). The interface may include a network interface, as is well known. The interface may process incoming communication and direct communication to various components of the exchange, such as the event engine and the matching engine. The interface 209 may accept indications of exchange events (e.g., a trade execution) and direct the information to a destination over the communication network 205.

In some embodiments, interface 209 may receive information about events related to the exchange. For example, such information may include information about order queues, information about prices, information about volatility, information executions, information about trading volumes, and so on. Such information may also be received from other elements of the exchange (e.g., the matching engine, the event engine, etc.) and/or from outside of the exchange (e.g., from an information source). Such information may be reported outside of the exchange. Accordingly, the exchange may act as an information source regarding such information. By obtaining information about events that occur on an exchange from the exchange rather than an outside information source, delay regarding the information may be decreased.

In some embodiments, interface 209 may include one or more machine components. Such components may include one or more processors, memory, and so on. It should be recognized that interface 209 is given as an example only, and that any or no interface and/or information source components may be included in other embodiments.

Communication network 211 may facilitate communication among components of the exchange 201. Communication network 211 may include a data bus of a single machine, and/or any other communication network (e.g., a LAN, etc.).

As mentioned above, exchange 201 may include an event engine 213. Event engine 213 may include one or more computer components. For example, event engine 213 may include a processor, a memory, and/or any other component. In some embodiments, an event engine may include a machine component (e.g., a processor) that determines when conditions are met based on the occurrences of events. In some embodiments, a condition may include a prerequisite that may occur before the condition is satisfied. A condition may include one or more events that may occur before the condition is satisfied. Any number of actions may be dependent on the condition being satisfied.

In some embodiments, event engine 213 may receive information identifying one or more events and information identifying one or more orders that may be conditioned on all or some of the events occurring. The event engine 213 may store information about the orders and events (e.g., in a database, in a memory, etc.). In one example implementation, event engine 213 may receive an electronic message through communication network 211 that was sent from participant 203. It should be understood that the message may undergo any number of transformations, may be broken into many packets or sub messages, may be received as multiple separate or connected messages, and so on. In one example, the message may indicate that an order to buy 100 shares of ESpeed should be placed on the exchange if a trading volume for shares of ESpeed reach a threshold level. It should be recognized that embodiments are not limited to simple market orders, but that various embodiments may include any type of orders.

In some embodiments, event engine 213 may receive information identifying one or more events and information identifying one or more actions that may be conditioned on all or some of the events occurring. The event engine 213 may store information about the actions and events (e.g., in a database, in a memory, etc.). In one example implementation, event engine 213 may receive an electronic message through communication network 211 that was sent from participant 203. It should be understood that the message may undergo any number of transformations, may be broken into many packets or sub messages, may be received as multiple separate or connected messages, and so on. In one example, the message may indicate that an order to buy 100 shares of ESpeed should be changed to an order to buy 50 shares of ESpeed if a price level of shares for ESpeed reach a certain threshold. In another example, the message may indicate that an order to buy 100 shares of ESpeed should be removed from a queue if an order to sell a number of shares of ESpeed above a certain threshold number is received. The message may indicate that the order to buy 100 shares of ESpeed should be returned to the queue if at least a threshold portion of the order to sell the number of shares is fulfilled. As yet another example, the message may indicate that a passive order to buy 100 shares of ESpeed should be changed to an aggressive order to buy the 100 shares of ESpeed if number of orders to buy shares of ESpeed reaches a threshold level. It should be recognized that these examples are non-limiting and given as illustrations of particular implementations.

In some implementations, such information may be processed and/or stored in such a way that analyzing whether an event occurred and/or determining what if any orders to place if an event occurs is easy. For example, a database in which such information is stored may be keyed based on event such that when an event occurs, all actions conditioned on that event may be easily looked up in the database.

In some embodiments, an event engine 213 may receive information regarding an occurrence of one or more events. Such events may include, for example, events occurring on the exchange, events occurring off the exchange, and so on. For example, information about events may be received through communication network 211. Such information may be received from an outside information source, from a matching engine of the exchange, from a remote machine of the exchange, and so on. In one example, an electronic message may indicate an event such as a value of trading volume of a stock for Espeed.

In some embodiments, an event engine may determine if information received about events satisfies one or more conditions on which orders and/or actions are conditioned. In some implementations, the event engine may make such a determination in response to receiving event information, periodically, randomly, and/or at any other time. In some implementations, such a determination may be made, for example by referencing stored information about conditions. In some implementations in which an order and/or action may be conditioned on multiple events, if an event occurs, then a flag may be set (e.g., in a database) to indicate that an event has occurred. If all conditions become flagged, the conditions may be satisfied. If an event occurs such that a condition is no longer satisfied (e.g., trading volume decrease) then a flag may be unset. It should be recognized that some orders may be conditioned on some and/or all conditions being satisfied. For example, an order may be conditioned on a complicated set of conditions such as (Condition A AND Condition B) OR (Condition C BUT NOT Condition D) OR (Condition E) in some implementations.

In some embodiments, an event engine may determine if conditions on which an order and/or action is conditioned are satisfied. For example, if an order is only conditioned on ESpeed trading volume reaching a particular level, and event information is received indicating that such a level has been reached, then the event engine may determine that conditions on which the order is conditioned have been satisfied. For example, in some implementations, the event engine may search and/or query a database or other collection of conditions to determine if flags are set for conditions associated with an order and/or action. It should be recognized that such determination may occur in any desired way, including but not limited to periodic querying of a database, database triggered messages, and so on. In more complicated conditioning, an event engine may determine if a set of conditions that trigger the order have been satisfied (e.g., from the example above, if A and B are true, if C is true but D is not, or if E is true).

In some embodiments, for one or more orders and/or actions which have satisfied conditions, the event engine may facilitate placement of one or more respective orders and/or carrying out of one or more respective actions. It should be recognized, that any number of orders may be placed and/or any number of actions may be taken when conditions are satisfied in some implementations.

In the ESpeed order example, the event engine 213 may facilitate placement of an order to buy 100 shares of ESpeed stock. The order may be placed in accordance with any other information received regarding the order as described above. In some embodiments, facilitating the placement of an order by the event engine may include causing the matching engine 207 to add the order to a queue of orders. In the ESpeed stock example, the event engine may cause an order to buy 100 shares of ESpeed stock to be added to a queue of buy orders of the matching engine.

As another example, a first order to buy 100 shares of ESpeed may be placed in a queue at a price of 100 dollars per share. An indication of an adjustment and a condition may be received. They may be received with an indication of the first order. The condition and adjustment may identify that a change to the order should be made if a condition is met.

For example, if a large order to sell shares of ESpeed is received (e.g., an order above a threshold, an order to sell more than 1000 shares), the requested adjustment may be to remove the order to buy the 100 shares from the queue. In some implementations, a second condition and action may be received. The second condition and action may be to return the order to the queue if some of the sell order is fulfilled (e.g., if a threshold portion is fulfilled, etc.), if a total quantity associated with sell orders is reduced (e.g., below some threshold amount), and/or if some other event occurs. An exchange may monitor for these conditions happened and facilitate adjustment to the orders accordingly.

As another example, if a change in price of orders to sell occurs (e.g., a large increase or decrease), the requested adjustment may be to increase or decrease a quantity associated with the order. For example, if a price decreases, a quantity may increase, if a price increases, a quantity may decrease.

As another example, if a change in quantity of orders to sell occurs, the first order may be changed from a passive order to an aggressive order. For example, if a quantity of available sell orders decreases below a threshold, then a passive buy order may be changed to an aggressive buy order. In some implementations, a quantity may be change as well.

It should be recognized that example actions and conditions are non limiting and that any combination of described actions and/or conditions, any related actions and/or conditions, and/or any other actions and/or conditions may be used in various embodiments. For example, any combination of increase in price offered and/or bid, decrease in price offered and/or bid, increase in quantity sought and/or available, decrease in quantity sought and/or available, and/or any other event may trigger any combination of actions such as changing status of order from passive to aggressive, changing types of orders, changing prices of orders, changing quantities of orders, cancelling orders, placing orders, and/or any other desired actions.

In some implementations, by processing event occurrences by an event engine that is part of an exchange, delays regarding the placement of orders and/or taking of actions conditioned on the event occurrences may be decreased. For example, if instead of such information being processed by event engine 213, it were processed off site by a participant 203, delays regarding receiving the event information may be increased (e.g., if the event information relates to events occurring at the exchange, if the participant has a slower connection to an information source than the exchange does, etc.), delays regarding placement of orders and/or taking of actions may be increased (e.g., by transmission through communication network 205, etc.), and so on.

In some implementations, a delay regarding transmitting information about an order (e.g., to place an order, to adjust an order, to remove and order, etc.) to the matching engine may be based on a communication network through which the information about the order is transmitted to the matching engine. In various implementations, a length of the communication network may be decreased to decrease such delay, a bandwidth of the communication network the be increased to decrease such delay, order information may be prioritized on the communication network to decrease such delay, a communication network may be dedicated to such functionality to decrease such delay, and so on.

In some embodiments, communication network 215 may include a data bus. The data bus may allow communication from the event engine to the matching engine. The data bus may be a specialized bus that allows such communication.

Such communication may be one way or two way. In some implementations, such a bus may directly couple event engine and matching engine in a same machine. In some implementations, the data bus may include an event injection bus. In some implementations, orders received through the bus may act as interrupts to the matching engine. In some implementations, an indication of an order and/or action(s) transmitted through the bus to the matching engine may be added to an instruction queue so that it is processed before at least one other pending instruction. For example, an instruction to process the order and/or action(s) may be added to the top of the instruction stack so that the order and/or actions(s) is the next thing processed by the matching engine. In some implementations, an instruction to process the order and/or action(s) may be added before instructions to process other pending orders and/or action(s). In some implementations, such an instruction may be added such that it is processed before orders and/or action(s) received from other sources (e.g., orders and/or action(s) not received from an event engine, orders and/or action(s) received from a participant 203, etc.). In some implementations a separate instruction queue may be maintained for orders and/or action(s) from the event engine which may be processed before other orders and/or action(s).

In some embodiments, a data bus may include a communication network that is used to transport information among/between/to/from component(s) of a machine. In some implementations, a data bus may provide much faster data transfer rates than communication networks that involve communication among multiple remote machines. In some implementations, a data bus can also provide direct memory and direct register access so that data and events may be injected from one machine component to another machine component.

In some implementations, by placing orders and/or action(s) received from an event engine at a higher priority than orders and/or action(s) received from other sources, those orders and/or action(s) may be processed and/or have an affect on an order queue sooner than and/or with a higher priority than those other orders and/or actions. This may occur even if the other orders and/or actions were received by the matching engine before the order and/or action(s) from the event engine.

In some implementations, prioritizing orders from the event engine may decrease a delay between an event happening and an order being added to a queue of orders. Such prioritizing may increase a priority level that the order receives if the matching engine is configured to prioritize orders based on when they are added to queues of orders.

In some embodiments, orders and/or actions may be time-stamped. Such time stamping may be used to aid prioritizing in an order queue by a matching engine. In some implementations, for example, an order and/or action transmitted from the event engine may be time-stamped with a time relative to an event occurring such as a time when the event occurred, a time when an indication of the event occurrence is processed by the event engine, a time when an original order that is being adjusted or added was originally placed or otherwise time stamped, and/or any other desired time. The matching engine may process the order and/or action using the time stamp to place an order in a place in the queue regardless of when the order and/or action was received by the matching engine. Accordingly, in some such implementations, even if the order and/or action is received and processed by the matching engine after an order and/or action from another source, the order and/or action from the event engine may be prioritized in an order queue above the other order and/or action based on a time stamp. The other order, for example, may have a later time stamp, and/or may not be time stamped. If the other order is not time stamped, it may be treated as if it had a time stamp equal to when it was added to a queue, or another event occurred.

It should be recognized that descriptions of individual components of FIG. 2A are given as examples only. It should also be recognized that the exchange of FIG. 2A is given as an example only. Any combination of components and any set of components may be used in various embodiments. Such components may include, for example, security components, credit components, reporting components, clearing components, and so on.

Figure 2B:
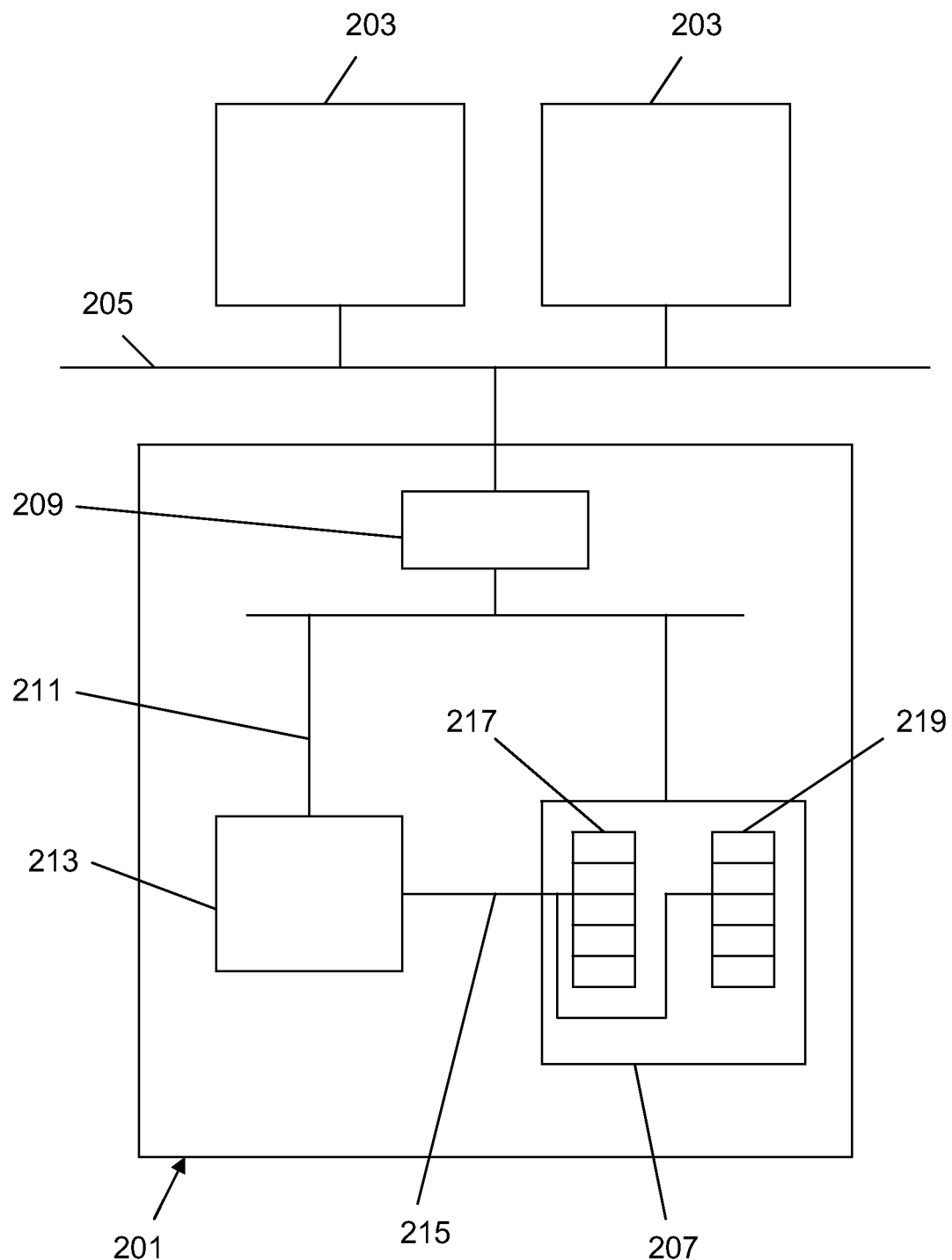

FIG. 2B illustrates an example embodiment in which communication network 215 is configured to allow direct memory access to queues 217 and 219 from event engine 213. In such an embodiment, order information in a queue may be altered by direct memory access of the information. For example, order information may be stored in a memory location (e.g., order price, order quantity, order time stamp, etc.). The memory location may be accessed (e.g., by the event engine or some other component) and information may be read and/or changed to adjust an order. In some embodiments, a queue may be searched for a particular order to determine the memory location through direct memory access (e.g., by following a series of links of a linked list to find an order, etc.). In some implementations, an event engine may track a memory location based on communication with the matching engine (e.g., a matching engine may transmit an indication of the memory location in which an order is placed to the event engine so that the event engine may record that information to later adjust the order). Such communication may occur with all orders, with some orders, with orders placed by the event engine, and so on. In some implementations, an order may be added and/or removed using such direct memory access (e.g., by adding a node in a list, by removing a node from a list, etc.).

Figure 2C:
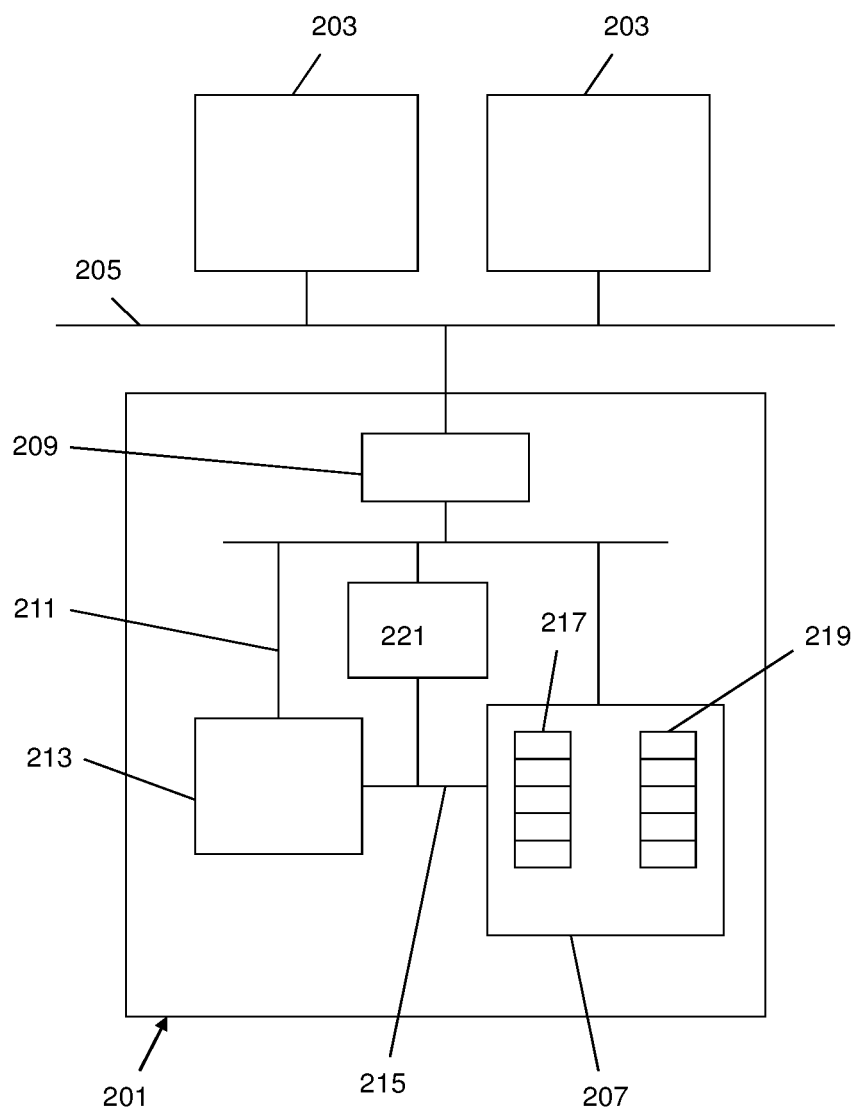

FIG. 2C illustrates another embodiment of an exchange with a separate rules or action processing element 221. The rules or action processing may process actions such as adjustments to orders similarly to the event engine described above. For example, the rules or actions processing element may track conditions on which an action is conditioned and facilitate actions for which conditions are satisfied. The rules or actions processing element may receive information about events from the event engine, the matching engine and/or from an outside source. Adjustments may be made through communication network 215 and/or 211.

It should be recognized that example exchanges of FIGS. 2A, 2B, and 2C are given as such examples and/or any other desired configuration or elements and that other embodiments may include any combination of elements therefrom.

Figure 3:
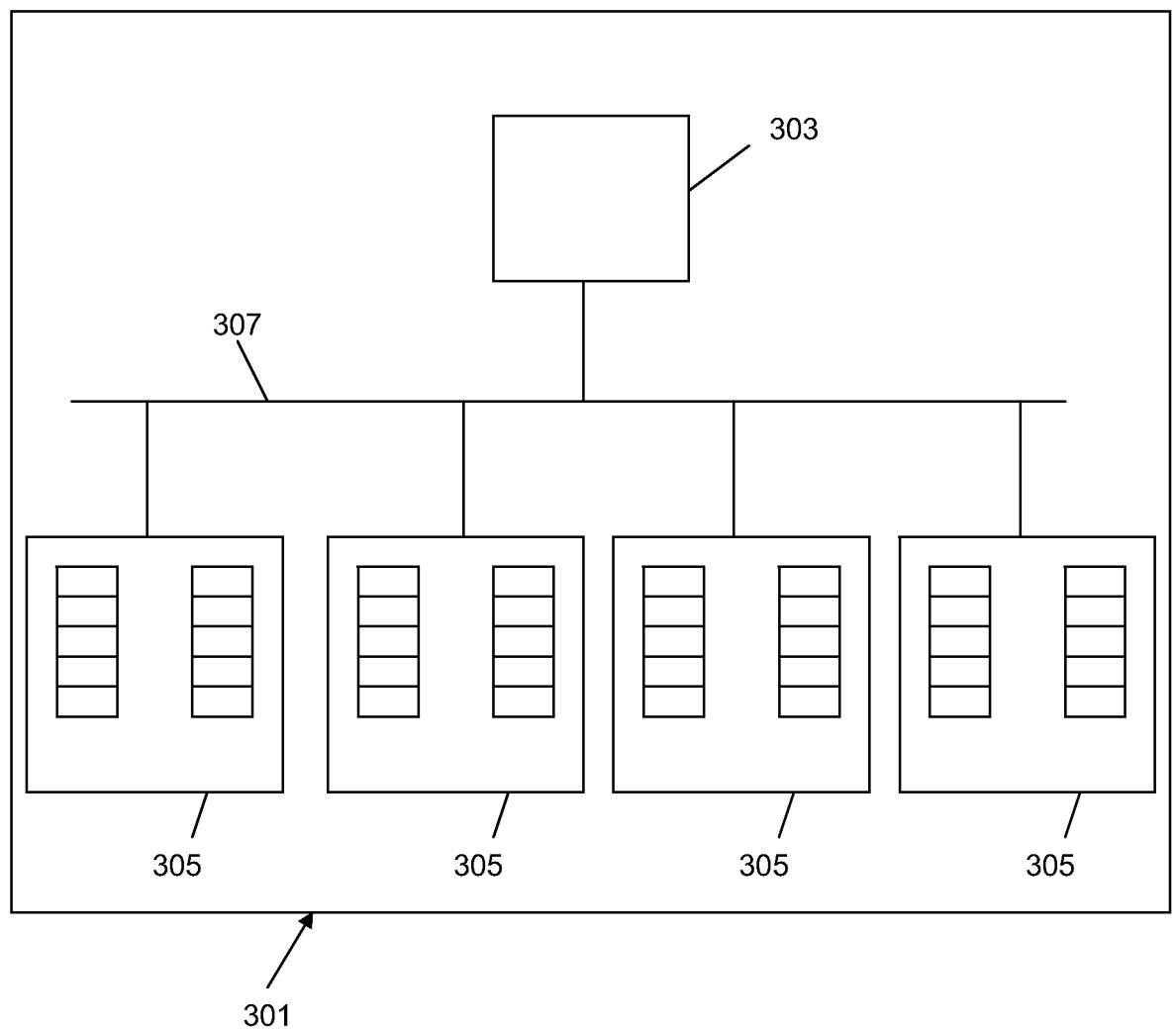
FIG. 3 illustrates another example exchange that may be used in some embodiments.

FIG. 3 illustrates an example embodiment of exchange 301 that includes an event engine 303, a plurality of matching engines 305, and a communication network 307. In some implementations, event engine 303 may interact with each of the matching engines 305 similarly to the above described interactions of FIG. 2A.

As mentioned above, a matching engine may be dedicated to one or more financial instruments, one or more types of orders for a financial instrument, one or more size ranges of orders, one or more action types, and so on. Accordingly, to provide more service for trading regarding a single financial instrument, and/or multiple financial instruments, multiple matching engines may be included in an exchange. Each matching engine may be tasked with a particular subset of the totality of the orders in the exchange in some implementations. In other implementations, matching engines may operate in parallel for the same set of orders to share the load of order processing such as for very liquid instruments.

In some embodiments, one or more event engines 303 may be coupled to a plurality of matching engines 305. The event engine 303 shown as one engine here, may provide orders and/or actions to the matching engines based on event occurrences as described above with respect to FIG. 2A. It should be recognize that multiple event engines may be paired with one matching engine, or multiple event engines may be paired with multiple matching engines, as desired. For example, an event engine may be designated to processes particular types of events, particular types of orders and so on.

In one example implementation, event engine 303 may process orders for financial instruments of ESpeed. Matching engines may each process one of bonds for ESpeed, preferred stock for ESpeed, common stock for ESpeed, and futures for ESpeed stock, respectively. The event engine may process orders related to all of such instruments. The event engine may process events related to such instruments and/or any other events.

Communications network 307 may include a data bus, as described above. The data bus may be a shared bus among the plurality of matching engines as shown. In other implementations, a dedicated data bus may couple each of the matching engines to the event engine.

It should be recognized that while FIG. 3 discusses an arrangement similar to FIG. 2A, other embodiments may be arranged to incorporate direct queue access as discussed with respect to FIG. 2B, a separate rule engine as discussed with respect to FIG. 2C, and/or any other desired components and/or arrangements.

Figure 4:
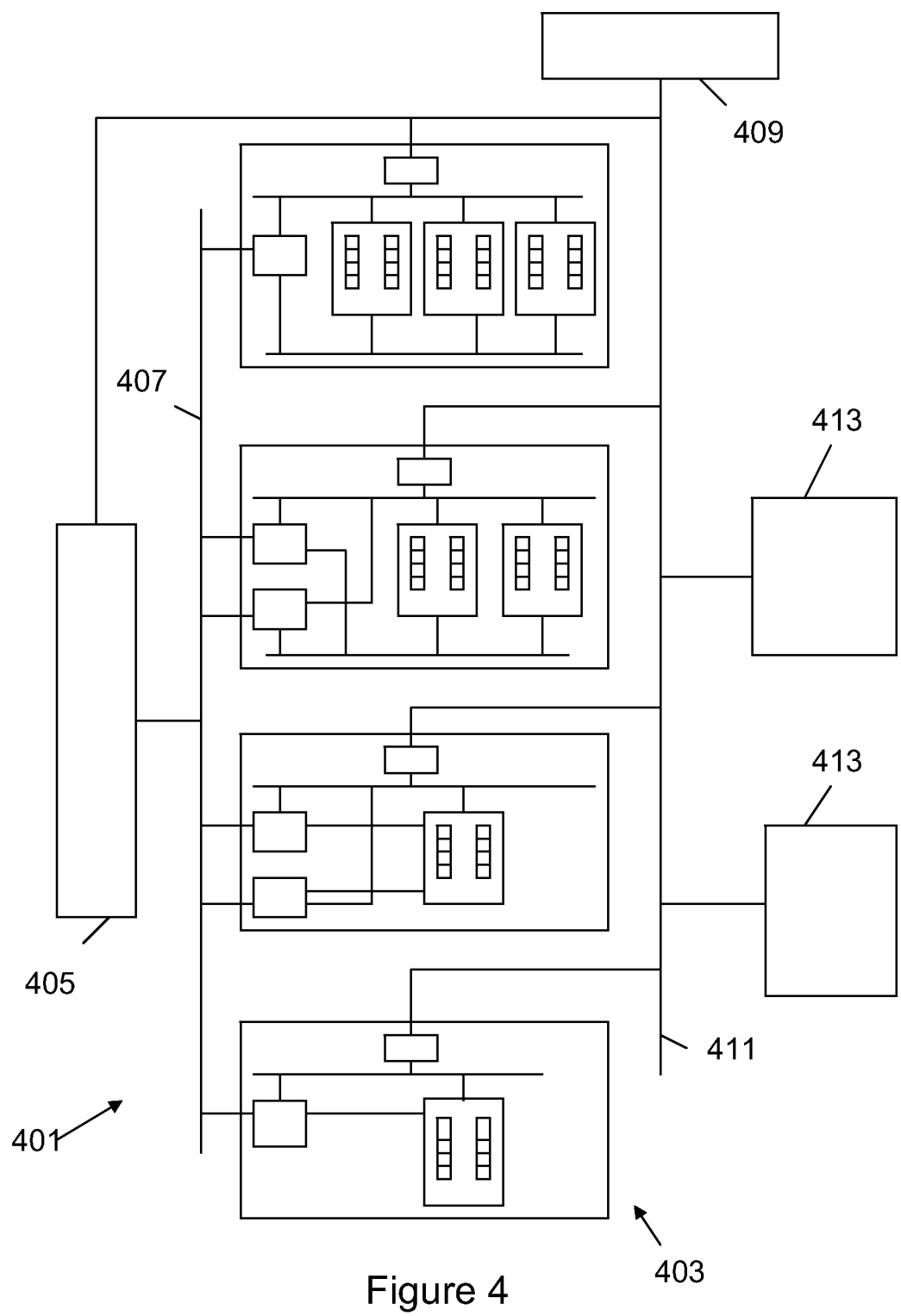
FIG. 4 illustrates yet another example that may be used in some embodiments.

FIG. 4 shows yet another example exchange. As illustrated in FIG. 4, exchange 401 may be implemented on a plurality of systems (e.g., blades, servers, machines, general purpose computers, etc.). The example exchange includes four order clusters 403, an event controller 405, an event network 407, an interface 409, a communications network 411, and additional components 413.

Order clusters 403 may include any number of matching engines and event engines, coupled in any way, as discussed above. An order cluster may be implemented on a blade, a server, etc. An order cluster may process orders, events, and/or actions related to a particular financial instrument, event type, action type, and/or order type. An exchange may have any number and/or configuration of order clusters.

An order cluster may include an event engine that is coupled to a communications network so that event information may be received and/or transmitted (e.g., from other event engines, to other event engines, from outside sources, to outside sources, to an event controller 405, from an event controller 405, etc.). Such a communication network is illustrated as event network 407 in FIG. 4. The event network may include a communications network that allows communication of event information among different systems and/or components. Such a network may be dedicated to event communication to reduce delays regarding communication of event information. For example, an event may relate to something that happens in a first order cluster and may be needed by a second order cluster to determine if orders should be generated. A high speed communication network dedicated to event information may reduce delays regarding such communication of such information. It should be recognized, however, that such a dedicated network may not be included in other embodiments, and that any configuration of communication network(s) may be used in various embodiments.

In some embodiments, an event controller 405 may receive information about events and transmit that information to one or more order cluster through an event network or any other communications network. In some embodiments, no event controller may be included. In some embodiments, no event engine may be included in a cluster, but instead the event controller may act as an event engine. In some embodiments, an event engine may provide any desired event processing, such as intermediate event processing, variable setting, communication of event information outside the network, etc.

In some embodiments, an order cluster may include an interface for communicating information, such as receiving orders, receiving conditions for orders, etc. Such an interface may couple with a communication network 411. Communication network 411 may act as a general communication network between components of an exchange. In other embodiments any configuration of communication network(s) may be used.

Interface 409 may interface between outside sources, such as participants, information sources, etc. and an exchange. Information may be received and transmitted through communication network 411 allowing components of the exchange to communicate with outside sources.

Addition components 413 may include any other desired components of an exchange. For example such components may include clearing houses, credit facilities, security facilities, a separate rule processing facility, and so on.

It should be recognized that this example exchange is non limiting and that any configuration of exchange components may be combined in any way in various embodiments. In some embodiments, for example, multiple configurations such as illustrated in FIG. 4 may be combined in any way to create an even larger exchange. Such abstraction may happen any number of times to create any sized exchange that can accommodate any number of orders desired. It should be recognized that while order clusters are described as similar to the configuration of FIG. 2A, other embodiments may include configurations that include direct queue access as described in FIG. 2b, separate rule processors as described in FIG. 2c, and/or any desired components and/or configurations.

Figure 5:
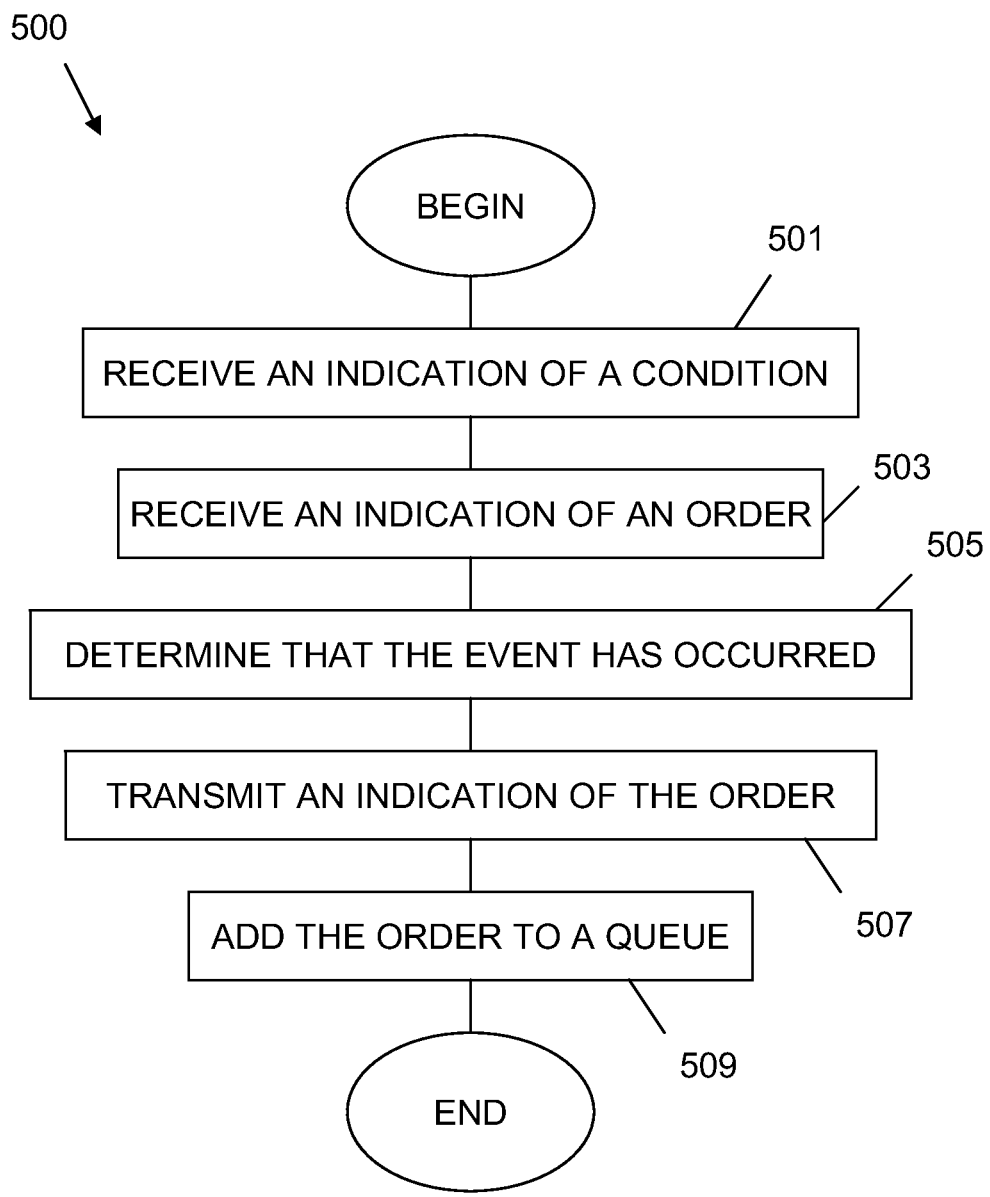
FIG. 5 illustrates an example method that may be performed in some embodiments.

FIG. 5 illustrates an example method 500 that may be performed in some embodiments. Method 500 may be performed by one or more processors and or other components of an exchange, such as matching engines, event engines, interfaces, and so on.

As indicated at block 501, method 500 may include receiving an indication of a condition. The indication may be received from a remote computer. The condition may define one or more events. A condition may be satisfied, as discussed above when the event occurs.

As indicated at block 503, method 500 may include receiving an indication of an order. The indication may be received from a remote computer. The remote computer may be the same computer from which the indication of the condition is received. The indication of the condition and the indication of the order may be received together (e.g., in one electronic message, at the same time, etc.), may be one indication, may be separate indications, and so on. The order may define a side of a trade for a financial instrument.

As indicated at block 505, method 500 may include determining that the event has occurred. Such a determination may be made by a processor. For example, such determination may be made by an event engine of an exchange. In some implementations, for example, such a determination may occur when an indication that the event occurred is received (e.g., from an outside source, from a matching engine, from another component of an exchange, etc.), may occur when a database of events is searched, may occur when an event occurs on an exchange (e.g., when a matching engine executes a trade, etc.), and so on. In some implementations, an indication of an event occurring may be received and/or transmitted by and/or to components of an exchange and/or outside sources.

As indicated at block 507, method 500 may include transmitting an indication of the order to a matching engine. Such an indication may be transmitted through a communication bus. The communication bus may couple the processor (e.g., an event engine) to another processor (e.g., a matching engine). Transmitting such an indication may occur in response to the determination of block 505.

As indicated at block 509, method 500 may include adding the order to a queue of orders. The queue of order may be part of a processor (e.g., a matching engine). The matching engine may be configured to determine matches among orders and execute trades to fulfill the matching orders, as described above.

It should be recognized the method 500 is an example only and that other method may include any set of acts. For example, time stamping, execution of orders, clearing or orders, adding to instruction stacks, reporting of orders, and so on may be included in various embodiments.

Figure 6:
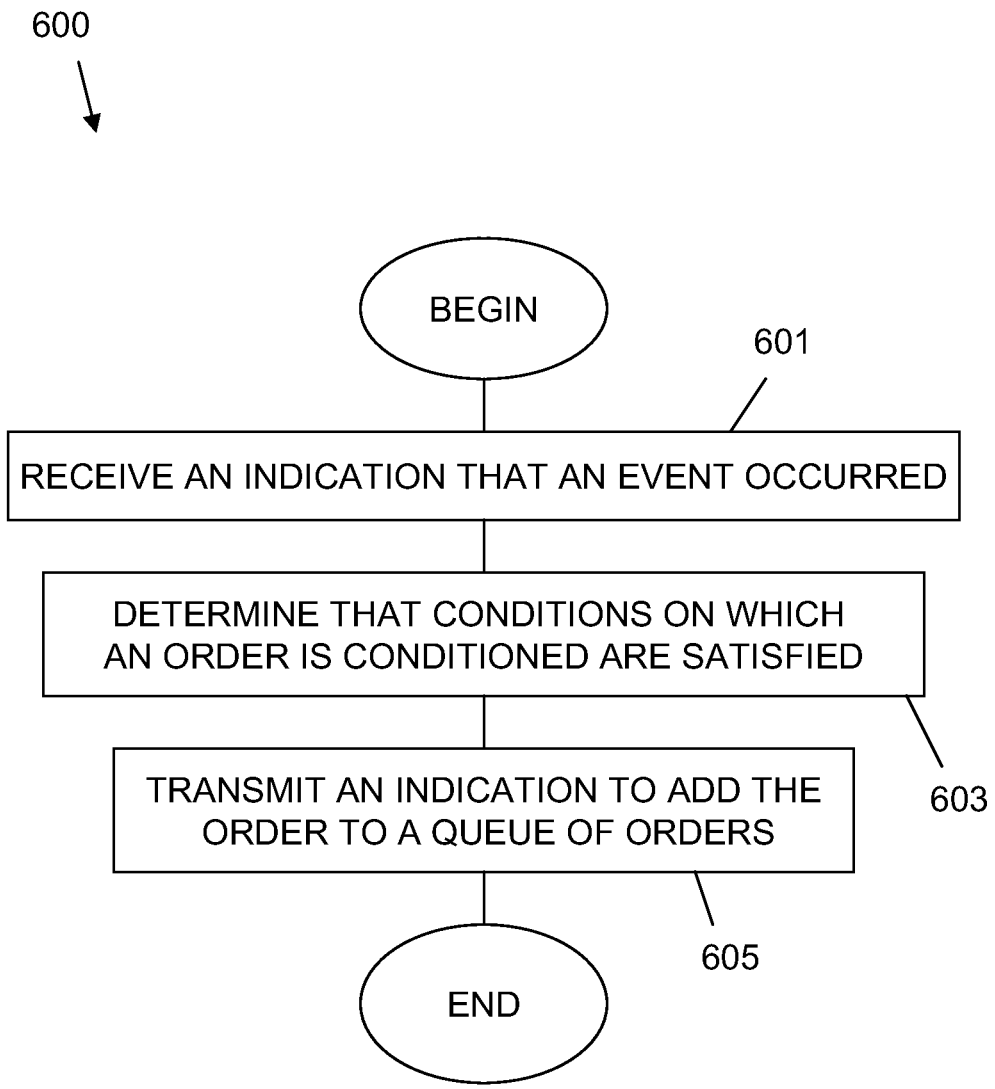
FIG. 6 illustrates another example method that may be performed in some embodiments.

FIG. 6 illustrates an example method 600 that may be performed in some embodiments. Method 600 may be performed by one or more processors and or other components of an exchange, such as an event engine.

As indicated at block 601, method 600 may include receiving an indication that an event occurred. Such an indication may be received from a remote computer, such as an information source outside of an exchange. Such an indication may be received from a processor, such as a matching engine, an event controller and so on. Such an indication may be received from any source of information desired.

As indicated at block 603, method 600 may include determining that conditions on which an order is conditioned are satisfied. The order may define a side of a trade for a financial instrument. The determination may be made by a processor of an exchange. The determination may be made by an event engine. The determination may be made by searching stored information, such as a database in which order and condition information is stored.

As indicated at block 605, method 600 may include transmitting an indication to add the order to a queue of orders. The queue of orders may be maintained by a matching engine of an exchange. The transmitting may be performed through a data bus. The data bus may couple processor of an exchange (e.g., an event engine performing the method and a matching engine that maintains the queue). The transmitting may be performed in response to the determination of block 603.

It should be recognized that method 600 is an example only and that other method may include any set of acts. For example, time stamping, receiving of orders, storing of orders, storing of conditions, searching of stored information, execution of orders, clearing or orders, adding to instruction stacks, reporting of orders, reporting of events, and so on may be included in various embodiments.

Figure 7:
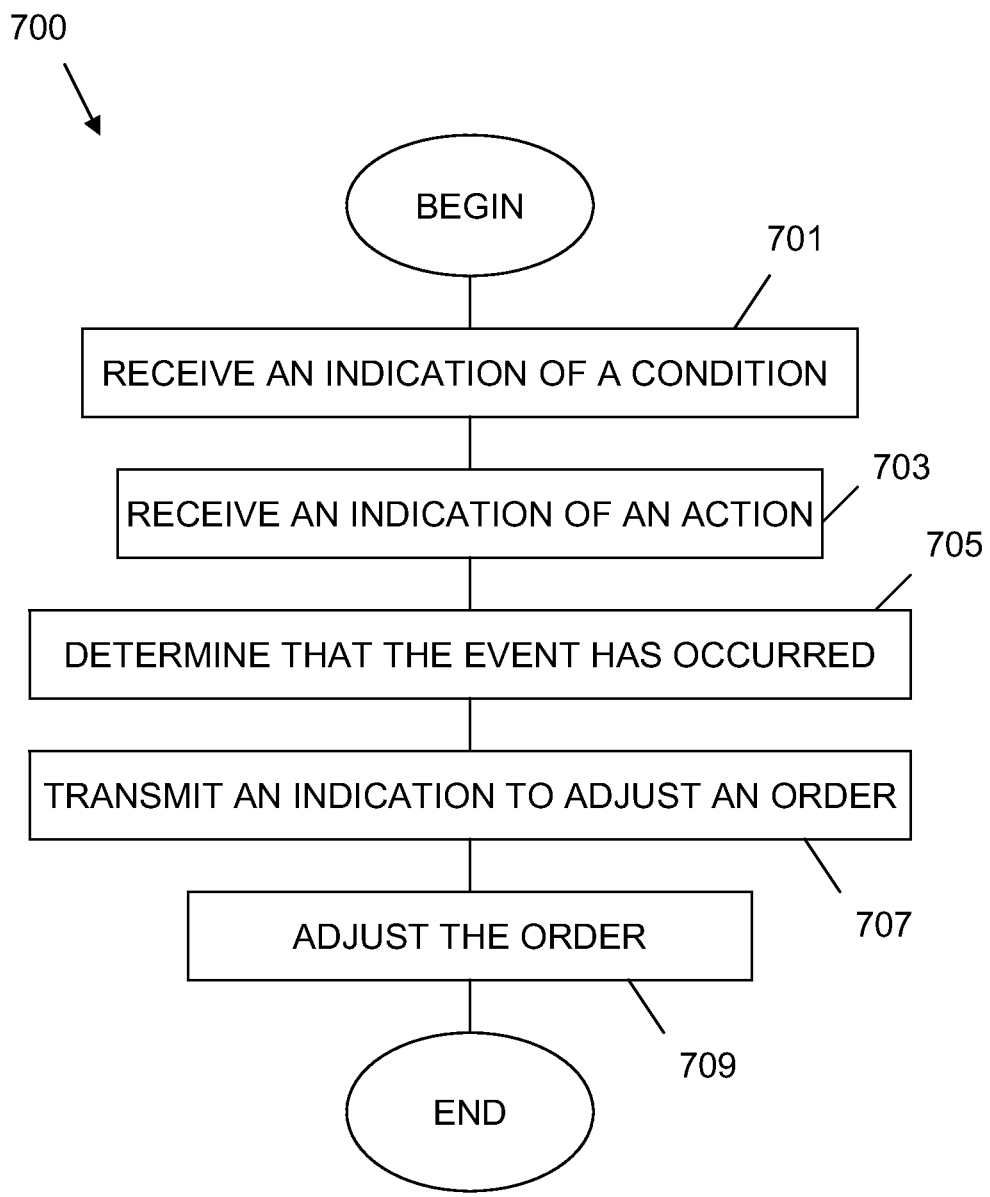
FIG. 7 illustrates another example method that may be performed in some embodiments.

FIG. 7 illustrates an example method 700 that may be performed in some embodiments. Method 700 may be performed by one or more processors and or other components of an exchange, such as matching engines, event engines, interfaces, and so on.

As indicated at block 701, method 700 may include receiving an indication of a condition. The indication may be received from a remote computer. The condition may define one or more events. A condition may be satisfied, as discussed above when the event occurs.

As indicated at block 703, method 700 may include receiving an indication of an action. The indication may be received from a remote computer. The remote computer may be the same computer from which the indication of the condition is received. The indication of the condition and the indication of the action may be received together (e.g., in one electronic message, at the same time, etc.), may be one indication, may be separate indications, and so on. The action may define an adjustment to an order for a financial instrument. An adjustment may include a cancellation, a temporary removal from a queue (e.g., until another event occurs), a change in quantity, a change in price, a replacement order to be placed in a queue, and so on. The action may include any other desired action to be taken when the conditions are satisfied.

As indicated at block 705, method 700 may include determining that the event has occurred. Such a determination may be made by a processor. For example, such determination may be made by an event engine of an exchange. In some implementations, for example, such a determination may occur when an indication that the event occurred is received (e.g., from an outside source, from a matching engine, from another component of an exchange, etc.), may occur when a database of events is searched, may occur when an event occurs on an exchange (e.g., when a matching engine executes a trade, etc.), and so on. In some implementations, an indication of an event occurring may be received and/or transmitted by and/or to components of an exchange and/or outside sources. Some example events may include a change in a value of a second financial instrument, a change in a trading volume of a second financial instrument, a release of earnings by a company, a placement of an order for an opposite side of a trade (e.g., an order meeting particular conditions such as at a price point with a quantity, and so on), a change to regulations that regulate an industry, a change in credit rating of a company, and so on.

As indicated at block 707, method 700 may include transmitting an indication to adjust an order to a matching engine. Such an indication may be transmitted through a communication bus. The communication bus may couple the processor (e.g., an event engine, a rule processor, etc) to another processor (e.g., a matching engine). Transmitting such an indication may occur in response to the determination of block 705.

As indicated at block 709, method 700 may include adjusting the order. An adjustment may include a cancellation, a temporary removal from a queue (e.g., until another event occurs), a change in quantity, a change in price, a replacement order to be placed in a queue, and so on. Adjusting the order may include adjusting an order pending in a queue of a matching engine, adding an order to a queue of the matching engine, and/or removing an order to a queue of a matching engine. The matching engine may be configured to determine matches among orders and execute trades to fulfill the matching orders, as described above.

In some embodiments, adjusting the order may include adjusting the order by the matching engine before performing at least one instruction pending in a stack of instructions. For example, an instruction to adjust the order may be added to the instruction stack of the matching engine before the at least one instruction (e.g., using an interrupt, using a direct memory access, etc.). The at least one instruction may include to at least one of add and remove another order to one of a queue of buy orders and a queue of sell orders.

In some embodiments, adjusting the order may include transmitting information to a memory location of a matching engine. The information may include an instruction, an order, an adjustment to an order, etc. In some implementations, the memory location may include a memory location associated with the order in a queue. In such an implementation, adjusting the order may include modifying information about the order stored in the memory location (e.g., using a direct memory access).

In some embodiments, adjusting an order may include removing an order from a queue of a matching engine. Removing an order from a queue may stop execution of trades against the order. Adjusting the order may include adding a replacement order to the queue of the matching engine. The replacement order may include an order with adjusted parameters (e.g., size, price, type, etc.). In one implementation, an original order may be a passive order (e.g., an order waiting for a match to be found) and a replacement order may be an aggressive order (e.g., an order to take/lift an order). In some implementations, the replacement order may be added to the queue at a same time-based priority as an original order. For example, a timestamp of an original order may be placed on a replacement order by the event engine and/or the matching engine. For example, an instruction may be transmitted to a matching engine indicating that a first order should be removed and a second order should be added to the queue with the same timestamp as the first order. In some implementations, an order may be removed with out a replacement being added (e.g., immediately, until after another event occurs, ever, etc.). For example, in one implementation, if a new order for an opposite side of a trade as the order is received and the new order is for a quantity above a threshold value, then the order may be removed from the queue. The order may be returned to the queue if a quantity associated with orders on the opposite side is reduced to below another threshold amount (e.g., if the new order is fulfilled, if the new order is cancelled, and so on).

In one example, an order may not be pending in a queue at a time associated with an occurrence of an event. For example, at the time an event occurs, at the time processing of the event occurrence occurs, and so on, an order may not be pending in a queue of the matching engine. Adjusting the order may include adding the order to the queue. The order may have previously been pending in the queue (e.g., before it was removed because of a prior adjustment conditioned on prior events). Adding the order to the queue may include adding the order to the queue at a time-based priority associated with the order when it was previously pending in the queue. For example, such an action may be conditioned on a reduction in a quantity associated with orders for an opposite side of a trade for the financial instrument as the order (e.g., after the quantity had previously reach above the threshold and triggered a removal of the order form the queue). In some implementations, time-based priority may be maintained with a time stamp (e.g., by adding the order to the queue with a timestamp that the order previously had). Such time stamps may be monitored and maintained by an event engine when an order is removed (e.g., by storing such information in a database associated with an event, order, and/or action). In some implementations, maintaining a time-based priority may be facilitated by adding the order to a queue through direct memory access of the queue so that the order is positioned in the queue where it would have been had it nor been removed. In some implementations, a processor (e.g., the event engine, a rule processor, etc.) may track where orders may be in the queue if they had not been cancelled, may place a placeholder order in the queue so that the order may be placed in the placeholder location at a later time, etc.

It should be recognized the method 700 is an example only and that other method may include any set of acts. For example, time stamping, execution of orders, clearing or orders, adding to instruction stacks, reporting of orders, and so on may be included in various embodiments.

Figure 8:
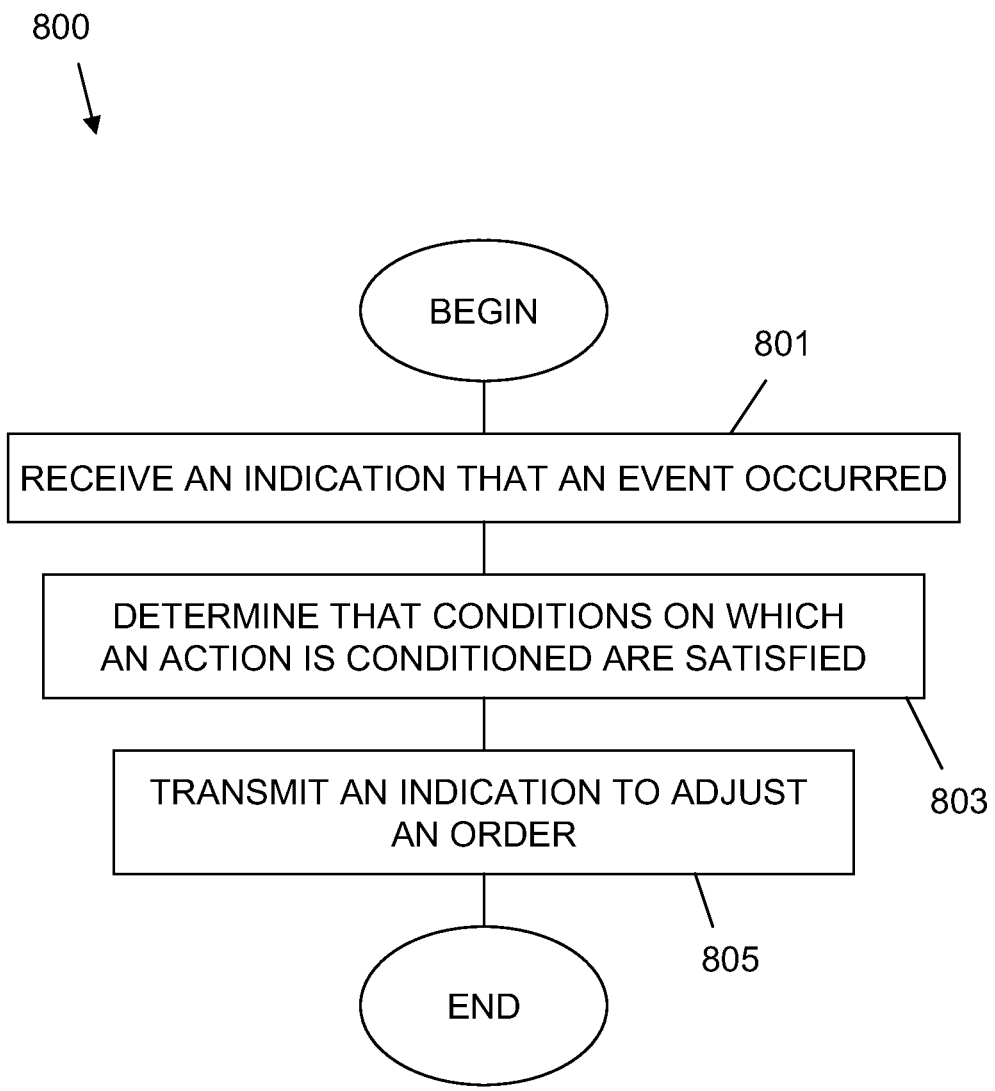
FIG. 8 illustrates another example method that may be performed in some embodiments.

FIG. 8 illustrates an example method 800 that may be performed in some embodiments. Method 800 may be performed by one or more processors and or other components of an exchange, such as an event engine.

As indicated at block 801, method 800 may include receiving an indication that an event occurred. Such an indication may be received from a remote computer, such as an information source outside of an exchange. Such an indication may be received from a processor, such as a matching engine, an event controller and so on. Such an indication may be received from any source of information desired.

As indicated at block 803, method 800 may include determining that conditions on which an action are conditioned are satisfied. The action may include an adjustment to an order that defines a side of a trade for a financial instrument. The determination may be made by a processor of an exchange. The determination may be made by an event engine. The determination may be made by searching stored information, such as a database in which order, action, and/or condition information is stored.

As indicated at block 805, method 800 may include transmitting an indication to make an adjustment to an order to a matching engine. The transmitting may be performed through a data bus. The data bus may couple processor of an exchange (e.g., an event engine performing the method and a matching engine that maintains the queue). The transmitting may be performed in response to the determination of block 803.

It should be recognized that method 800 is an example only and that other method may include any set of acts. For example, time stamping, receiving of orders, storing of orders, storing of conditions, searching of stored information, execution of orders, clearing or orders, adding to instruction stacks, reporting of orders, reporting of events, and so on may be included in various embodiments.

Figure 9:
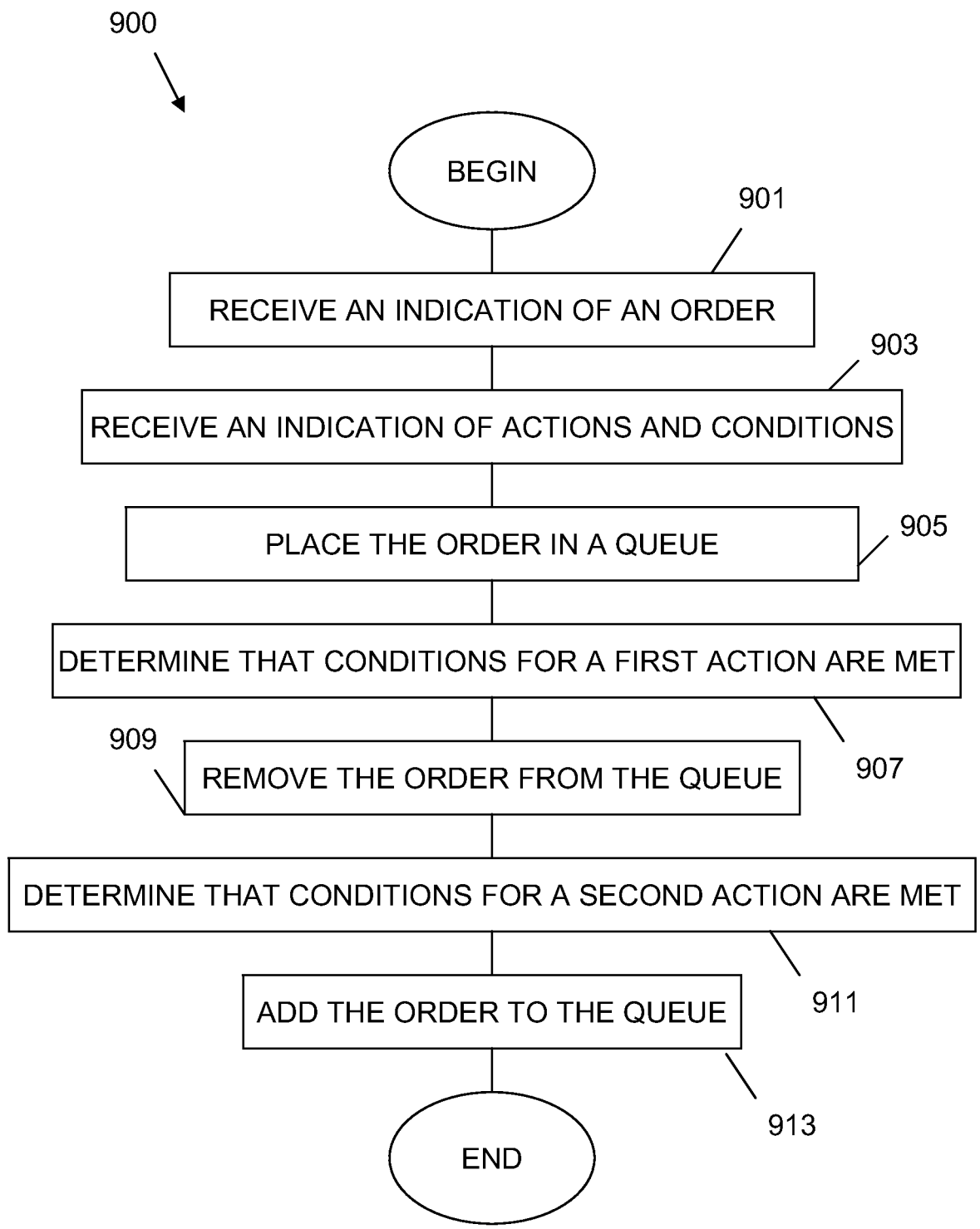
FIG. 9 illustrates another example method that may be performed in some embodiments.

FIG. 9 illustrates an example method 900 that may be performed in some embodiments. Method 900 may be performed by one or more processors and or other components of an exchange, such as matching engines, event engines, interfaces, and so on. Method 900 may include a method in which an order is placed in a queue, later removed from the queue, and then restored to the queue even later.

As indicated at 901, method 900 may include receiving an indication of an order. As indicated at 903, method 900 may include receiving an indication of actions and conditions. Each action may include any number of conditions on which the action may be conditioned. An action may be unavailable for performance until another action takes place. For example, an action to return an order to a queue may not be available unless an order is first removed from a queue.

As indicated at 905, method 900 may include placing an order in a queue. As described above, a queue may be maintained by a matching engine.

As indicated at 907, it may be determined that conditions for a first action are met. Conditions may include any number of events occurring, for example. In one example, a condition may be that a price change occurred. In another example, a condition may be that orders for the opposite side of a trade as the order reached a certain quantity of financial instruments.

As indicated at 909, an action may be taken in response to the determination. For example, the illustrated action is a removal of the order from the queue. It should be recognized that any other desired action may be taken in other examples. The order may be removed by taking the order out of the queue maintained by the matching engine, by flagging the order as inactive in the queue of the matching engine, by replacing the order with a placeholder order in the queue of the matching engine, and/or by performing any other desired actions.

As indicated at block 911 it may be determined that conditions for a second action are met. Conditions may include any number of events occurring, for example. Conditions may include that the first action was taken. In one example, a condition may be that a price change occurred (e.g., that prices returned to a previously range). In another example, a condition may be that orders for opposite side of a trade as the order reached a certain quantity of financial instruments (e.g., returned to a range near when the first action was taken, etc.).

As indicated at 913, a second action may be taken in response to the determination. For example, the illustrated action is an addition of the order to the queue. It should be recognized that any other desired action may be taken in other examples. The order may be added by placing the order in the queue maintained by the matching engine, by flagging the order as active in the queue of the matching engine, by replacing a placeholder order with the order and/or by performing any other desired actions. The order may be placed with a same time based priority as when it was previously in the queue.

It should be recognized that example processes and systems are given as non-limiting illustrations only. Other embodiments may include different actions, steps, components, elements, configurations, orders, and so on.

XII. Further Embodiments

The following should be interpreted as example embodiments, and not as claims.

A. An apparatus comprising:
- a matching engine, in which the matching engine is configured to:
  - receive indications of orders, in which each order defines a respective side of a trade for a financial instrument,
  - add each of the orders to a respective one of a queue of buy orders and a queue of sell orders for the financial instrument,
  - determine that at least a first order in the queue of buy orders and a second order in the queue of sell orders match, and
  - execute a trade that fulfill the first order and the second order;
- an event engine configured to:
  - receive an indication of an occurrence of an event,
  - determine that an adjustment to an order is conditioned on the occurrence, in which the order defines a side of a trade for the financial instrument; and
  - in response to the determination, transmit an indication to adjust the order to the matching engine through a data bus; and
- the data bus, in which the data bus is configured to allow communication of the indication to add the order from the event engine to the matching engine.

A.1. The apparatus of claim A, in which the data bus and the matching engine are configured such that when the indication to add the order is received by the matching engine, the matching engine adds the order before performing at least one instruction pending in a stack of instructions.

A.1.1. The apparatus of claim A.1, in which the at least one instruction includes an instruction to adjust the order.

A.1.1.1. The apparatus of claim A.1.1, in which the instruction to adjust the order includes at least one of an instruction to change a quantity of the order, and an instruction to change a price of the order.

A.1.1.2. The apparatus of claim A.1.1, in which the instruction to adjust the order includes an instruction to remove the order.

A.1.1.2.1. The apparatus of claim A.1.1.2, in which the instruction to adjust the order includes an instruction to add a replacement order.

A.1.1.2.1.1. The apparatus of claim A.1.1.2.1, in which the order includes a passive order and the replacement order includes an aggressive order.

A.1.1.2.1.2. The apparatus of claim A.1.1.2.1, in which the instruction to adjust includes an instruction to add the replacement order with a same time-based priority as the order.

A.1.1.2.2. The apparatus of claim A.1.1.2, in which the event includes a placement of an order for an opposite side of the trade for the financial instrument that is associated with a quantity above a threshold value.

A.1.2. The apparatus of claim A.1, in which the data bus is configured to transmit information to a memory location of the matching engine; and the matching engine is configured to read data from the memory location.

A.1.3. The apparatus of claim A.1, in which the at least one instruction includes an instruction to process an indication to add another order to at least one of the queue for sell orders and the queue for buy orders, in which the indication to add the other order was not received by the matching engine from the data bus.

A.2. The apparatus of claim A, in which the event includes at least one of:
- a change in a value of a second financial instrument;
- a change in a trading volume of a second financial instrument;
- a release of earnings by a company;
- a placement of an order for an opposite side of the trade;
- a change to regulations that regulate an industry; and
- a change in credit rating of a company.

A.3. The apparatus of claim A, in which the event engine is configured to receive the indication of the occurrence from a remote information source.

A.4. The apparatus of claim A, in which the event engine is configured to receive the indication of the occurrence from the matching engine.

A.5. The apparatus of claim A, in which at a time associated with the event, the order is not pending in a queue of the matching engine, and in which the indication to adjust the order includes an indication to add the order to the queue of the matching engine.

A.5.1. The apparatus of claim A.5, in which the indication to add the order includes an indication to add the order at a time-based priority associated with the order when it was previously in the queue.

A.5.2. The apparatus of claim A.5, in which the event includes a reduction in a quantity associated with orders for the opposite side of the trade for the financial instrument.

B. A method of operating an exchange, the method comprising:

receiving an indication of a condition from a remote computer, in which the condition defines an event, and in which the condition is satisfied when the event occurs;

receiving a first indication of an action from the remote computer, in which the action defines an adjustment to an order for a financial instrument;

determining, by a processor of the exchange, that the event has occurred;

in response to the determination, transmitting an indication to adjust the order to a matching engine of the exchange, through a communication bus that couples the processor and the matching engine, in which the matching engine is configured to determine matches among orders and execute trades to fulfill the matching orders; and adjusting the order.

B.1. The method of claim B, in which the indication of the condition and the indication of the action are received as a single communication.

B.2. The method of claim B, in which adjusting the order includes adjusting the order by the matching engine before performing at least one instruction pending in a stack of instructions.

B.2.1. The method of claim B.2, in which the at least one instruction includes an instruction to at least one of add and remove another order to one of a queue of buy orders and a queue of sell orders.

B.3. The method of claim B, in which adjusting the order includes transmitting, by the processor, information to a memory location of the matching engine.

B.3.1. The method of claim B.3, in which the memory location includes the memory location associated with the order in a queue, and adjusting the order includes modifying, by the processor, information about the order stored in the memory location.

B.4. The method of claim B, in which the event includes at least one of:
a change in a value of a second financial instrument;
a change in a trading volume of a second financial instrument;
a release of earnings by a company;
a placement of an order for an opposite side of a trade;
a change to regulations that regulate an industry; and
a change in credit rating of a company.

B.5. The method of claim B, further comprising receiving an indication of the occurrence from a remote information source.

B.6. The method of claim B, further comprising receiving an indication of the occurrence from the matching engine.

B.7. The method of claim B, in which adjusting the order includes at least one of changing a quantity of the order and changing a price of the order.

B.8. The method of claim B, in which adjusting the order includes removing the order from a queue of the matching engine.

B.8.1. The method of claim B.8, in which adjusting the order includes adding a replacement order to the queue of the matching engine.

B.8.1.1. The method of claim B.8.1, in which the order includes a passive order and the replacement order includes an aggressive order.

B.8.1.2. The method of claim B.8.1, in which adding the replacement order to the queue includes adding the replacement order with a same time-based priority as the order.

B.8.2. The method of claim B.8, in which the event includes a placement of an order for an opposite side of a trade from the order and that is associated with a quantity above a threshold value.

B.9. The method of claim B, in which at a time associated with the event, the order is not pending in a queue of the matching engine, and in which the indication to adjust the order includes an indication to add the order to the queue of the matching engine.

B.9.1. The method of claim B.9, in which the indication to add the order includes an indication to add the order at a time-based priority associated with the order when it was previously in the queue.

B.9.2. The method of claim B.9, in which the event includes a reduction in a quantity associated with orders for an opposite side of a trade for the financial instrument as the order.

C. A method comprising:

receiving, from a remote computer, an indication that an event occurred;

determining, by a processor, that conditions on which an action is conditioned are satisfied, in which the action includes an adjustment to an order that defines a side of a trade for a financial instrument; and in response to the determination, transmitting an indication to make the adjustment to the order to a matching engine through a data bus that couples the processor and the matching engine.

C.1. The method of claim C, in which transmitting the indication to make the adjustment includes transmitting an indication to adjust at least one of a price of the order and a quantity of the order.

C.2. The method of claim C, in which transmitting the indication to make the adjustment includes transmitting an indication to remove the order from a queue of the matching engine.

C.2.1. The method of claim C.2, in which transmitting the indication to make the adjustment includes transmitting an indication to add a replacement order to the queue of the matching engine.

C.2.1.1 The method of claim C.2.1, in which the order includes a passive order and the replacement order includes an aggressive order.

C.2.1.2. The method of claim C.2.1, in which the indication to make the adjustment includes an indication to add the replacement order to the queue with a same time-based priority as the order.

C.2.2. The method of claim C.2, in which the event includes a placement of an order for an opposite side of a trade from the order and that is associated with a quantity above a threshold value.

C.3. The method of claim C, in which transmitting the indication to make the adjustment includes transmitting information to a memory location of the matching engine.

C.3.1. The method of claim C.3, in which the memory location includes a memory location in which the order is stored in a queue of the matching engine.

C.3.2. The method of claim C, in which transmitting the indication to make the adjustment includes transmitting an instruction to an instruction stack of the matching engine.

C.4. The method of claim C, in which the event includes at least one of:
a change in a value of a second financial instrument;
a change in a trading volume of a second financial instrument;
a release of earnings by a company;
a placement of an order for an opposite side of a trade;
a change to regulations that regulate an industry; and
a change in credit rating of a company.

C.5. The method of claim C, comprising receiving the indication of the event occurrence from a remote information source.

C.6. The method of claim C, comprising receiving the indication of the event occurrence from the matching engine.

C.7. The method of claim C, in which at a time associated with the event, the order is not pending in a queue of the matching engine, and in which the indication to make the adjustment includes an indication to add the order to the queue of the matching engine.

C.7.1. The method of claim C.7, in which the indication to add the order includes an indication to add the order at a time-based priority associated with the order when it was previously in the queue.

C.7.2. The method of claim C.7, in which the event includes a reduction in a quantity associated with orders for the opposite side of the trade for the financial instrument.

What is claimed is:

1. A method for controlling an electronic exchange system,
in which the electronic exchange system includes a physical data bus, a first physical processing element of at least one processor and a second physical processing element of the at least processor, and
in which the physical data bus directly communicatively couples the first physical processing element and the second physical processing element, and wherein the physical data bus is configured to deliver instructions from the first physical processing element to the second physical processing element,
in which the method comprises:
controlling, by the at least one processor, the second physical processing element to:
receive indications of orders from remote devices that are not part of the electronic exchange system, wherein each order defines a respective side of a trade for a financial instrument;
add each of the orders to a respective one of a queue of buy orders and a queue of sell orders for the financial instrument;
determine that at least a first order in the queue of buy orders and a second order in the queue of sell orders match, and
execute a trade that fulfill the first order and the second order; and
controlling, by the at least one processor, the first physical processing element to:
receive an indication of an occurrence of an event;
in response to receiving the indication of occurrence of the event, determine that an adjustment to an order is conditioned on at least one criteria associated with the occurrence;
determine that the at least one criteria associated with the occurrence on which the order is conditioned is satisfied; and
in response to determining the at least one criteria is satisfied, transmit, through the physical data bus, to the second physical processing element, an indication to adjust the order that acts as an interrupt to processing of the second physical processing element to cause the second physical processing element to, in response to receiving the indication to adjust the order, adjust the order.

2. The method of claim 1, wherein the second physical processing element further comprises a physical memory having a stack of machine instructions; and
further comprising controlling, by the at least one processor, in response to the indication to adjust the order being received by the second physical processing element, the second physical processing element to insert an instruction to adjust the order corresponding to the indication to adjust the order in the stack of machine instructions before at least one instruction pending in the stack of machine instructions and before processing a given instruction in the stack of machine instructions.

3. The method of claim 2, in which the at least one instruction includes a second instruction to adjust the order.

4. The method of claim 2, in which the instruction to adjust the order includes at least one of an instruction to change a quantity of the order, and an instruction to change a price of the order.

5. The method of claim 2, in which the instruction to adjust the order includes an instruction to remove the order.

6. The method of claim 5, in which the instruction to adjust the order includes an instruction to add a replacement order.

7. The method of claim 6, in which the order includes a passive order and the replacement order includes an aggressive order.

8. The method of claim 6, in which the instruction to adjust includes an instruction to add the replacement order with a same time-based priority as the order.

9. The method of claim 5, in which the event includes a placement of an order for an opposite side of the trade for the financial instrument that is associated with a quantity above a threshold value.

10. The method of claim 2, in which the physical data bus is configured to transmit information indicated by the indication to adjust the order to a physical memory location within the stack of machine instructions in the second physical processing element such that the physical memory location is accessed by direct memory access from the first physical processing element; and
the method further comprises controlling, by the at least one processor, the second physical processing element to read data from said physical memory location.

11. The method of claim 2, in which the at least one instruction includes an instruction to process an indication to add another order to at least one of the queue for sell orders and the queue for buy orders that was received by the second physical processing element before the order was received by the second physical processing element, in which the indication to add the other order was not received by the second physical processing element from the physical data bus, and the order is added before the instruction is executed based on receipt of the order not being from the physical data bus.

12. The method of claim 1, in which the event includes at least one of:
a change in a value of a second financial instrument;
a change in a trading volume of a second financial instrument;
a placement of an order for an opposite side of the trade;
a change to regulations that regulate an industry; or
a change in credit rating of a company.

13. The method of claim 1, in which at a time associated with the event, the order is not pending in a queue of the second physical processing element, and in which the indication to adjust the order includes an indication to add the order to the queue of the second physical processing element.

14. The method of claim 13, in which the indication to add the order includes an indication to add the order at a time-based priority associated with the order when the order was previously in the queue.

15. The method of claim 13, in which the event includes a reduction in a quantity associated with orders for the opposite side of the trade for the financial instrument.

16. The method of claim 1, further comprising:
controlling, by the at least one processor, the second physical processing element to transmit to the first physical processing element an indication of a physical memory location in which the order is stored.

17. The method of claim 16, further comprising:
controlling, by the at least one processor, the first physical processing element to record the indication of the physical memory location in which the order is stored.

18. The method of claim 11, wherein the at least one instruction to add another order to at least one of the queue for sell orders and the queue for buy orders comprises a better price than the price of the order.

19. A method for controlling operation of an electronic exchange system,
in which the electronic exchange system includes a physical data bus, a first physical processing element of at least one processor and a second physical processing element of the at least processor, and
in which the physical data bus directly communicatively couples the first physical processing element and the second physical processing element, and wherein the physical data bus is configured to deliver instructions from the first physical processing element to the second physical processing element,
in which the second physical processing element comprises a physical memory having a stack of machine instructions, wherein the physical data bus and the second physical processing element are configured such that, when an indication to adjust an order is received by the second physical processing element, the indication to adjust the order acts as an interrupt to processing of the second physical processing element
in which the method comprises:
controlling, by the at least one processor, the second physical processing element to:
in response to an indication to adjust the order being received by the second physical processing element, insert an instruction to adjust the order corresponding to the indication to adjust the order in the stack of machine instructions before at least one instruction pending in the stack of machine instructions and before processing a given instruction in the stack of machine instructions,
receive indications of orders, wherein each order defines a respective side of a trade for a financial instrument;
add each of the orders to a respective one of a queue of buy orders and a queue of sell orders for the financial instrument;
determine that at least a first order in the queue of buy orders and a second order in the queue of sell orders match;
transmit to the first physical processing element an indication of a physical memory location in which the order is stored;
execute a trade that fulfill the first order and the second order; and
record the indication of the physical memory location in which the order is stored; and
controlling, by the at least one processor, the first physical processing element to:
receive an indication of an occurrence of an event, wherein the event includes at least one of:
a placement of an order for an opposite side of the trade for the financial instrument that is associated with a quantity above a threshold value
a change in a value of a second financial instrument;
a change in a trading volume of a second financial instrument;
a placement of an order for an opposite side of the trade;
a change to regulations that regulate an industry; or
a change in credit rating of a company, and
wherein, at a time associated with the event, the order is not pending in a queue of the second physical processing element, and the indication to adjust the order includes an indication to add the order to the queue of the second physical processing element;
in response to receiving the indication of occurrence of the event, determine that an adjustment to an order is conditioned on at least one criteria associated with the occurrence;
determine that the at least one criteria associated with the occurrence on which the order is conditioned is satisfied; and
in response to determining the at least one criteria is satisfied, transmit, through the physical data bus, to the second physical processing element, the indication to adjust the order.

* * * * *